US012100895B2

(12) United States Patent
Hu

(10) Patent No.: US 12,100,895 B2
(45) Date of Patent: Sep. 24, 2024

(54) ULTRA-WIDE BAND ANTENNA USING WAVE-ABSORBING MATERIAL AND DIELECTRIC

(71) Applicant: Nan Hu, Irvine, CA (US)

(72) Inventor: Nan Hu, Irvine, CA (US)

(73) Assignee: Nan Hu, Irvine, CA (US)

( * ) Notice: Subject to any disclaimer, the term of this patent is extended or adjusted under 35 U.S.C. 154(b) by 0 days.

(21) Appl. No.: 18/134,042

(22) Filed: Apr. 13, 2023

(65) Prior Publication Data

US 2024/0250447 A1 Jul. 25, 2024

Related U.S. Application Data

(63) Continuation of application No. PCT/CN2022/095730, filed on May 27, 2022.

(30) Foreign Application Priority Data

Jul. 28, 2021 (CN) ......................... 202110859574.4

(51) Int. Cl.
*H01Q 13/02* (2006.01)
*H01Q 17/00* (2006.01)

(52) U.S. Cl.
CPC ........... *H01Q 17/001* (2013.01); *H01Q 13/02* (2013.01)

(58) Field of Classification Search
CPC ........ H01Q 13/00; H01Q 13/02; H01Q 17/00; H01Q 17/001
See application file for complete search history.

(56) References Cited

U.S. PATENT DOCUMENTS 4,040,061 A * 8/1977 Roberts .............. H01Q 13/0208 343/786
6,995,728 B2 * 2/2006 Rodriguez ......... H01Q 13/0275 343/786

(Continued)

FOREIGN PATENT DOCUMENTS

CA 2861587 A1 * 7/2013 ......... H01Q 13/0275
CN 201570581 U 9/2010

(Continued)

OTHER PUBLICATIONS

Pavel D. Kuroptev et al. "Modified 0.6-50 GHz Ultra-Wideband Double-Ridged Horn Antenna Design for Parameters Improvement" Proceedings of the 47th European Microwave Conference, Jan. 8, 2018, pp. 1313-1316.

(Continued)

*Primary Examiner* — Tho G Phan
(74) *Attorney, Agent, or Firm* — Samson G. Yu

(57) ABSTRACT

Disclosed in the present disclosure is an ultra-wide band antenna using a wave-absorbing material and a dielectric, which relates to the technical field of antennas. The antenna includes an upper fixing plate and a lower fixing plate, a left side plate and a right side plate are fixed between the upper fixing plate and the lower fixing plate separately, and the upper fixing plate, the lower fixing plate, the left side plate and the right side plate are fixed together to form a cylindrical structure. A cavity is fixed at the left end opening of the cylindrical structure, a first wave-absorbing material block is fixed in the cavity, an upper ridge and a lower ridge are arranged in the cylindrical structure, and tail ends of the upper ridge and the lower ridge are inserted into the first wave-absorbing material block.

10 Claims, 13 Drawing Sheets

(56) References Cited

U.S. PATENT DOCUMENTS

| | | | | |
|---|---|---|---|---|
| 7,969,376 | B2 * | 6/2011 | Steghafner | H01Q 13/0275 343/773 |
| 11,936,107 | B2 * | 3/2024 | Sheng | H01Q 17/00 |
| 2009/0079649 | A1 | 3/2009 | Steghafner et al. | |
| 2018/0131098 | A1 | 5/2018 | Morgan et al. | |

FOREIGN PATENT DOCUMENTS

| | | | | |
|---|---|---|---|---|
| CN | 203013932 | U | 6/2013 | |
| CN | 104466415 | A | 3/2015 | |
| CN | 204375967 | U | 6/2015 | |
| CN | 104993243 | A | 10/2015 | |
| CN | 107732435 | A | 2/2018 | |
| CN | 110600877 | A | 12/2019 | |
| CN | 210129585 | U | 3/2020 | |
| CN | 210894444 | U | 6/2020 | |
| CN | 113594702 | A | 11/2021 | |
| JP | 2005312049 | A * | 11/2005 | H01Q 13/0275 |
| WO | 9712252 | A1 | 4/1997 | |

OTHER PUBLICATIONS

Hiroyuki Arai et al. "Wide Band Electrical Parameter Measurement by Absorber Pasted Ridged Horn Antenna" 2015 9th European Conference on Antennas and Propagation (EuCAP), Aug. 31, 2015, ISSN: 2164-3342, cols. 1-4.

* cited by examiner

ULTRA-WIDE BAND ANTENNA USING WAVE-ABSORBING MATERIAL AND DIELECTRIC

CROSS-REFERENCE TO RELATED APPLICATIONS

The disclosure claims the right of priority to the Chinese patent application No. 202110859574.4, filed to the Chinese Patent Office on Jul. 28, 2021 and entitled "Ultra-wide band antenna using wave-absorbing material and dielectric", which is incorporated in its entirety herein by reference.

TECHNICAL FIELD

The present disclosure relates to the technical field of antennas, and in particular to an ultra-wide band antenna capable of maintaining consistent gain over a wide range of frequencies.

BACKGROUND

With a high transmission rate, strong multi-path interference resistance, high confidentiality, contribution to multi-functional integration, etc., the ultra-wide band (UWB) communication technology has become highly competitive and promising in short-distance wireless communication field. At present, most ultra-wide band antennas with tapered radiation patterns, whereas an ultra-wide band antenna with a unidirectional radiation pattern is rarely designed. The unstable radiation pattern and low gain are far from satisfying application requirements.

SUMMARY

A technical problem to be solved by the disclosure is to provide an ultra-wide band antenna capable of maintaining consistent gain over a wide range of frequencies, increasing the gain and improving a high-frequency pattern.

In order to solve the above technical problem, some embodiments of the disclosure employ the technical solution as follows: an ultra-wide band antenna using a wave-absorbing material and a dielectric includes an upper fixing plate and a lower fixing plate, and a left side plate and a right side plate are fixed between the upper fixing plate and the lower fixing plate separately. The upper fixing plate, the lower fixing plate, the left side plate and the right side plate are fixed together to form a cylindrical structure with a smaller left end opening and a larger right end opening, a cavity is fixed at the left end opening of the cylindrical structure, and a first wave-absorbing material block is fixed in the cavity. An upper ridge and a lower ridge are arranged in the cylindrical structure, the upper ridge is fixedly connected with the upper fixing plate, and the lower ridge is fixedly connected with the lower fixing plate. Tail ends of the upper ridge and the lower ridge are inserted into the first wave-absorbing material block. The upper ridge and the lower ridge are oppositely arranged, and a dielectric rod is arranged between the upper ridge and the lower ridge. Both the upper fixing plates on two sides of the upper ridge and the lower fixing plates on two sides of the lower ridge are provided with second wave-absorbing material blocks separately.

In some embodiments, several openings are formed in each of the left side plate and the right side plate, such that a left side wall and a right side wall of the cylindrical structure are of an open structure.

In some embodiments, a tail end opening of the cavity is closed by a cover plate.

In some embodiments, a connector fixing seat is fixed on an upper side plate of the cavity, and a connector is fixed to the connector fixing seat by a connector fixing plate.

In some embodiments, the tail end of the upper ridge close to the first wave-absorbing material block is provided with a first central hole penetrating the tail end up and down, the tail end of the lower ridge close to the first wave-absorbing material block is provided with a second central hole penetrating the tail end up and down, and the first central hole and the second central hole are oppositely provided. An upper end of a central column is electrically connected with the connector, a lower end of the central column passes through the first central hole and then enters the second central hole, and a lower end of the central column is inserted into a bottom of the second central hole. A middle of the central column is connected with an upper end of the second central hole in a clamped manner.

In some embodiments, an inner diameter of the first central hole is greater than a diameter of the central column, and an inner diameter of the second central hole is equal to the diameter of the central column.

In some embodiments, a protrusion extending outwards is formed on a middle of the central column, and an outer diameter of the protrusion is greater than an inner diameter of the second central hole, and is smaller than an inner diameter of the first central hole, such that the protrusion is clamped to an upper end opening of the second central hole.

In some embodiments, the first wave-absorbing material block includes a first left wave-absorbing material half block, a first right wave-absorbing material half block and a wave-absorbing material connecting block. The first left wave-absorbing material half block and the first right wave-absorbing material half block are of a bilateral symmetrical structure, and tail ends of the first left wave-absorbing material half block and the first right wave-absorbing material half block are connected together by the wave-absorbing material connecting block. A structure of an insertion groove is formed between the first left wave-absorbing material half block and the first right wave-absorbing material half block, the tail ends of the upper ridge and the lower ridge are inserted into the insertion groove, and half grooves with gradually reduced depths are formed in surfaces of the first left wave-absorbing material half block and the first right wave-absorbing material half block that are close to inner sides.

In some embodiments, the dielectric rod includes a hemispherical portion located at an end portion and a cylindrical portion connected with a plane of the hemispherical portion, and a diameter of the cylindrical portion gradually decreases from the end portion to a tail portion. Two opposite clamping grooves are formed in the cylindrical portion, and a portion of the upper ridge and a portion of the lower ridge are inserted into the clamping grooves of the dielectric rod separately.

In some embodiments, several small conical protrusions are formed on a surface of the first wave-absorbing material block which is not in contact with the cavity, or several small through holes are formed on a surface of the first wave-absorbing material block.

The beneficial effects generated by employing the above technical solution lie in that the ultra-wide band antenna maintains consistent gain in a wide range of frequencies, and replaces a plurality of standard gain horn antennas, thereby being quite suitable for antenna characterization and calibration. The employed dielectric rod serves as a lens to control a beam width and associated gain, and the digitally optimized lens is able to significantly improve a beam profile and gain. The antenna may be used for measurement and/or ultra-wide band communication, and wide band operation is quite suitable for material measurement, and time domain and radar cross-section (RCS) measurement. Excellent impedance matching and gain consistency provide a unique combination of applications and performance. In addition, by forming the wave-absorbing materials between the ridge and the upper fixing plate and between the ridge and the lower fixing plate, an effect of stabilizing a high-frequency pattern is achieved, and the high-frequency pattern is improved. Moreover, the wave-absorbing material is arranged in the cavity, such that a frequency of the antenna may be lower. In some embodiments, the protrusions or through holes are formed in the wave-absorbing material arranged in the cavity, such that an area of absorbing electromagnetic waves is increased, and incident electromagnetic waves in all directions are better absorbed.

BRIEF DESCRIPTION OF THE DRAWINGS

The present disclosure will be further described in detail below with reference to the accompanying drawings and particular embodiments.

Figure 1:
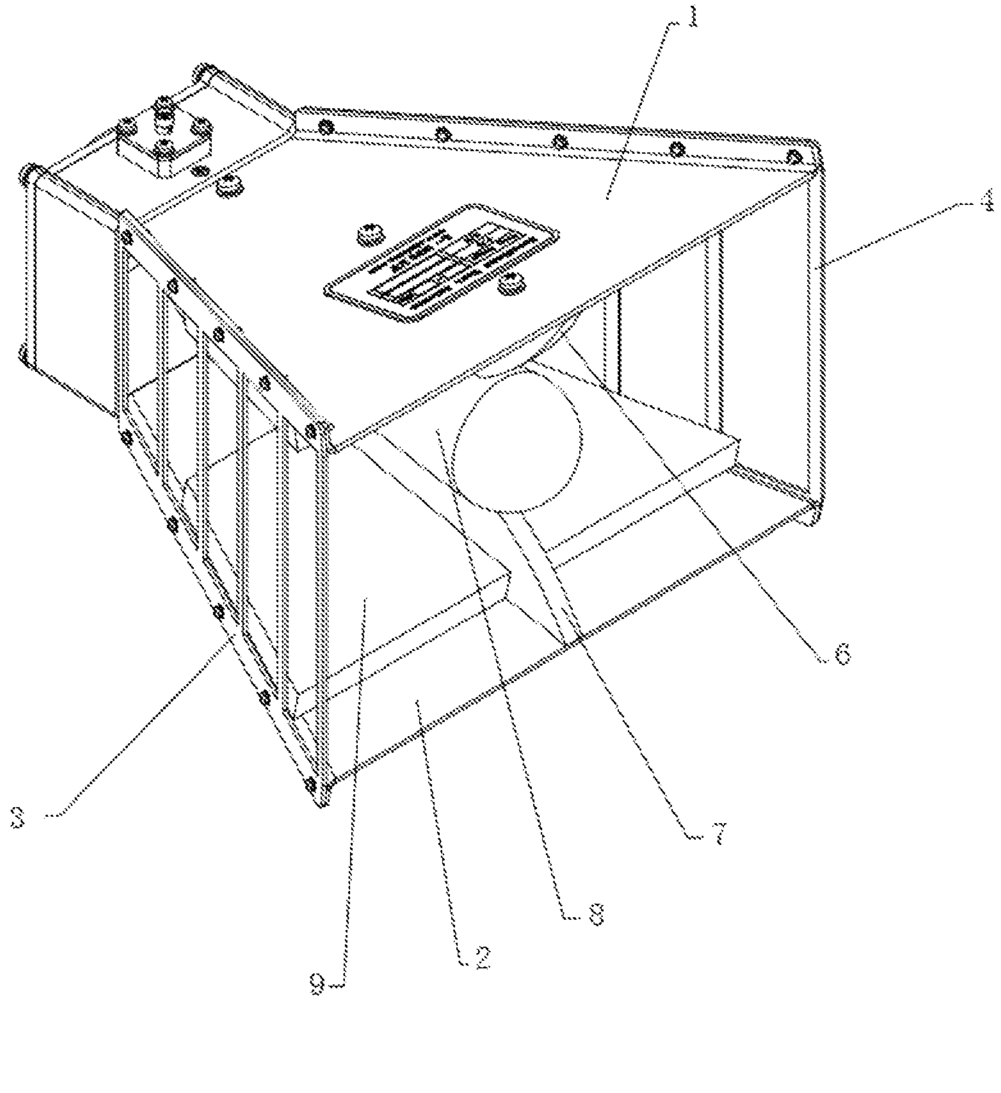
FIG. 1 is a schematic diagram of a three-dimensional structure of an antenna in an embodiment of the present disclosure.

In the figures: 1. upper fixing plate; 2. lower fixing plate; 3. left side plate; 4. right side plate; 5. first wave-absorbing material block; 5-1. first left wave-absorbing material half block; 5-2. first right wave-absorbing material half block; 5-3. wave-absorbing material connecting block; 5-4. insertion groove; 6. upper ridge; 7. lower ridge; 8. dielectric rod; 8-1. hemispherical portion; 8-2. cylindrical portion; 8-3. clamping groove; 9. second wave-absorbing material block; 10. cover plate; 11. cavity; 12. connector fixing seat; 13. connector; 14. connector fixing plate; 15. first central hole; 16. second central hole; 17. central column; 18. protrusion; 19. small conical protrusion; and 20. small through hole.

DETAILED DESCRIPTION OF THE EMBODIMENTS

The technical solution in the embodiments of the present disclosure will be clearly and completely described below with reference to the accompanying drawings in the embodiments of the present disclosure. Apparently, the embodiments described above are merely some embodiments rather than all embodiments of the present disclosure. On the basis of the embodiments of the present disclosure, all other embodiments acquired by those of ordinary skill in the art without making creative efforts fall within the scope of protection of the present disclosure.

Many specific details are set forth in the following description to facilitate full understanding of the present disclosure, but the present disclosure can also be implemented in other ways different from those described herein, similar derivatives may be made by those skilled in the art without departing from the connotation of the present disclosure, and therefore, the present disclosure is not limited by the particular embodiments disclosed below.

As shown in FIGS. 1-6 and FIG. 9, disclosed in an embodiment of the present disclosure is an ultra-wide band antenna using a wave-absorbing material and a dielectric, which includes an upper fixing plate 1 and a lower fixing plate 2, and a left side plate 3 and a right side plate 4 are fixed between the upper fixing plate 1 and the lower fixing plate 2 separately. The upper fixing plate 1, the lower fixing plate 2, the left side plate 3 and the right side plate 4 are fixed together to form a cylindrical structure having a smaller left end opening and a larger right end opening, and the upper fixing plate 1, the lower fixing plate 2, the left side plate 3 and the right side plate 4 are made of metal materials. A cavity 11 is fixed at the left end opening of the cylindrical structure, and a first wave-absorbing material block 5 is fixed in the cavity 11. An upper ridge 6 and a lower ridge 7 are arranged in the cylindrical structure, the upper ridge 6 is fixedly connected with the upper fixing plate 1 in an attached manner, the lower ridge 7 is fixedly connected with the lower fixing plate 2 in an attached manner, and the upper ridge 6 and the lower ridge 7 are made of metal materials. Tail ends of the upper ridge 6 and the lower ridge 7 are inserted into the first wave-absorbing material block 5. The upper ridge 6 and the lower ridge 7 are opposite, a dielectric rod 8 is arranged between the upper ridge and the lower ridge, and the dielectric rod 8 is able to concentrate fields between the ridges, thereby increasing gain and improving a high-frequency pattern.

Second wave-absorbing material blocks 9 are formed at the upper fixing plates 1 on two sides of the upper ridge 6 and the lower fixing plates 2 on two sides of the lower ridge 7 separately, and the first wave-absorbing material block 5 and the second wave-absorbing material blocks 9 are made of a wave-absorbing material. By adding the wave-absorbing material, an effect of stabilizing a high-frequency pattern is stabilized, and the high-frequency pattern is improved. In some embodiments, connection between the first wave-absorbing material block 5 as well as the second wave-absorbing material blocks 9 and other components may be achieved by bonding. It should be noted that the first wave-absorbing material block 5 and the second wave-absorbing material blocks 9 are entirely made of the wave-absorbing material, and may be integrated or split in structure, and in some embodiments, a flat cavity structure may be considered for use.

Figure 2:
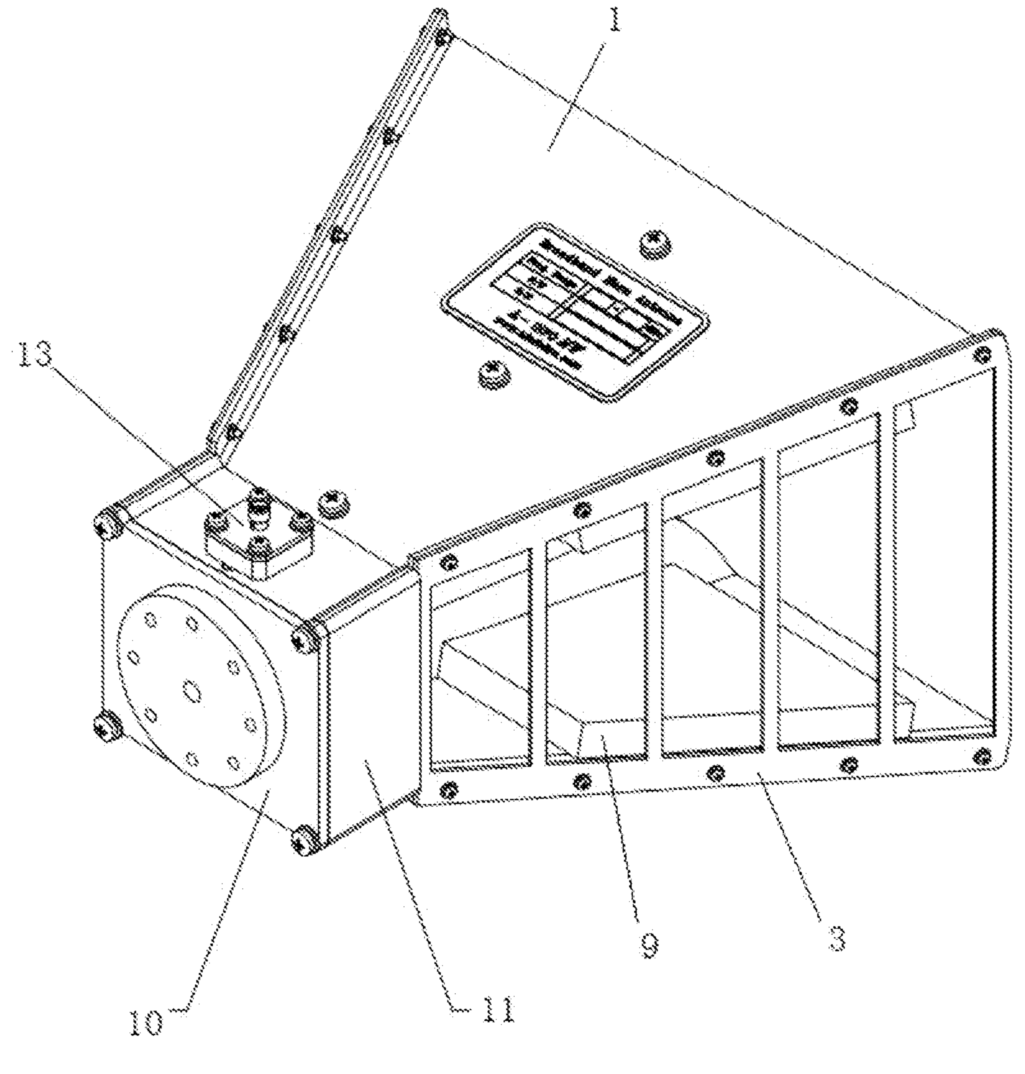
FIG. 2 is a schematic diagram of a three-dimensional structure of an antenna in an embodiment of the present disclosure.
Figure 3:
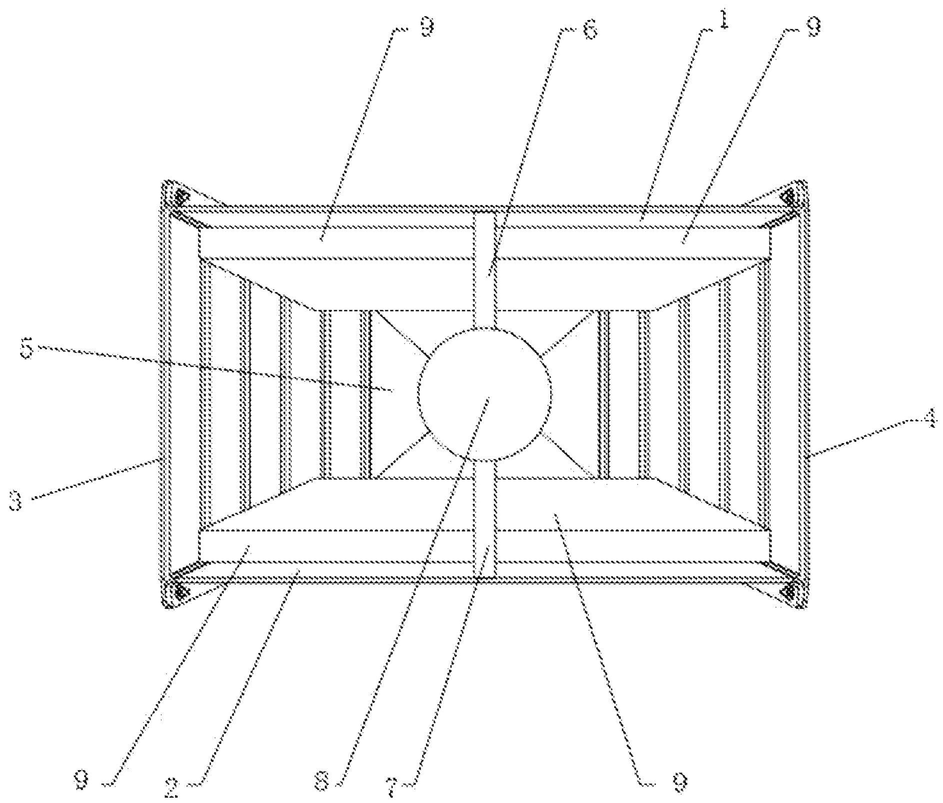
FIG. 3 is a schematic structural diagram from a right view of an antenna in an embodiment of the present disclosure.
Figure 4:
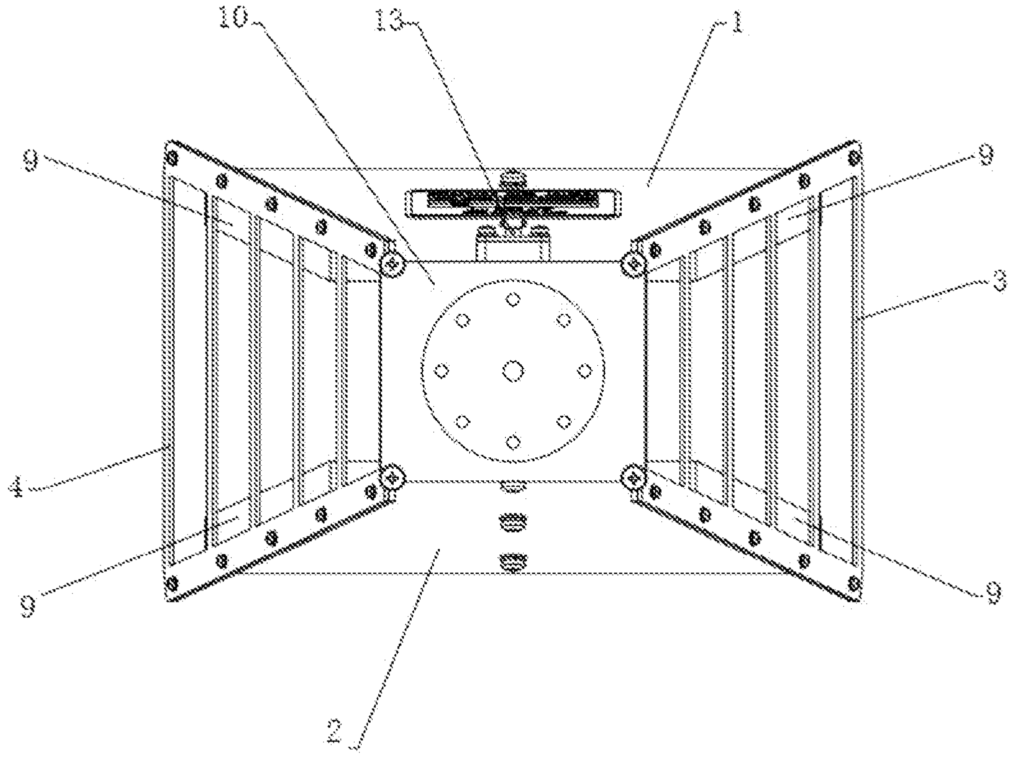
FIG. 4 is a schematic structural diagram from a left view of an antenna in an embodiment of the present disclosure.
Figure 5:
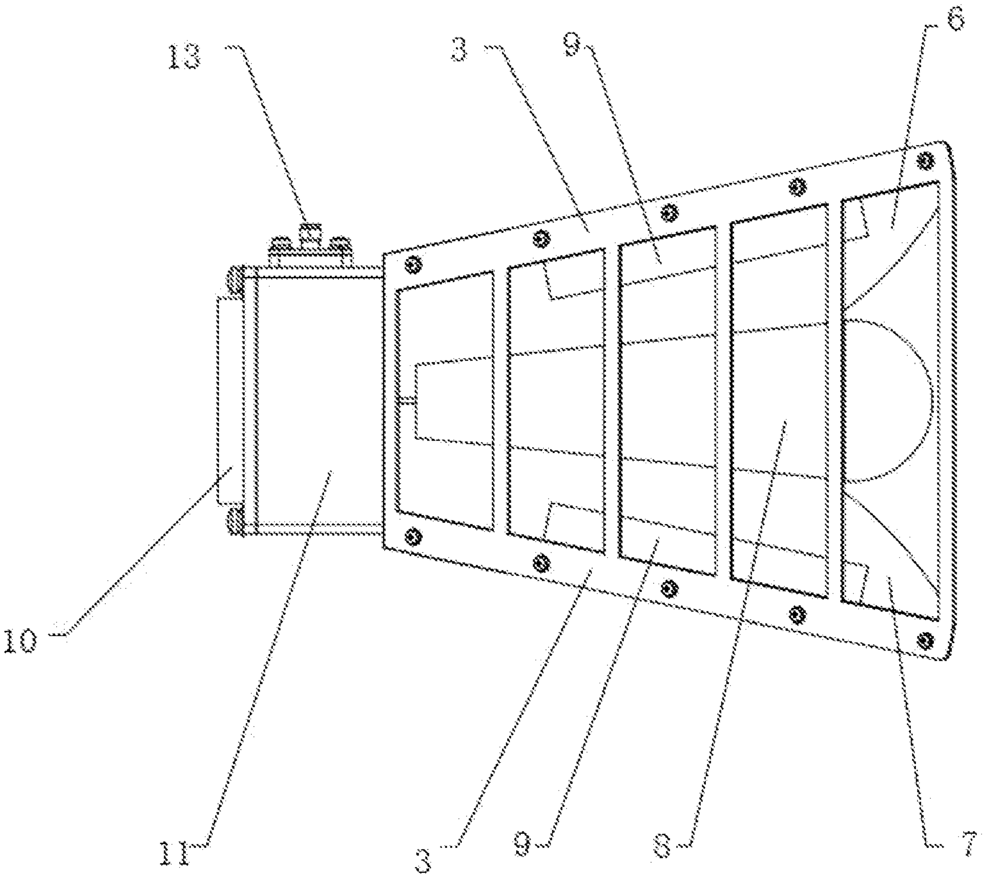
FIG. 5 is a schematic structural diagram from a front view of an antenna in an embodiment of the present disclosure.

In some embodiments, as shown in FIG. 1 and FIG. 2, multiple openings are formed in each of the left side plate 3 and the right side plate 4, such that a left side wall and a right side wall of the cylindrical structure are of an open structure, and the frequency of the antenna is higher by arranging the open structures.

In some embodiments, as shown in FIG. 2, FIG. 4, FIG. 6 and FIG. 9, a tail end opening of the cavity is closed by a cover plate 10, and multiple blind holes are formed in the cover plate 10 for facilitating connection to an antenna fixing seat.

Figure 9:
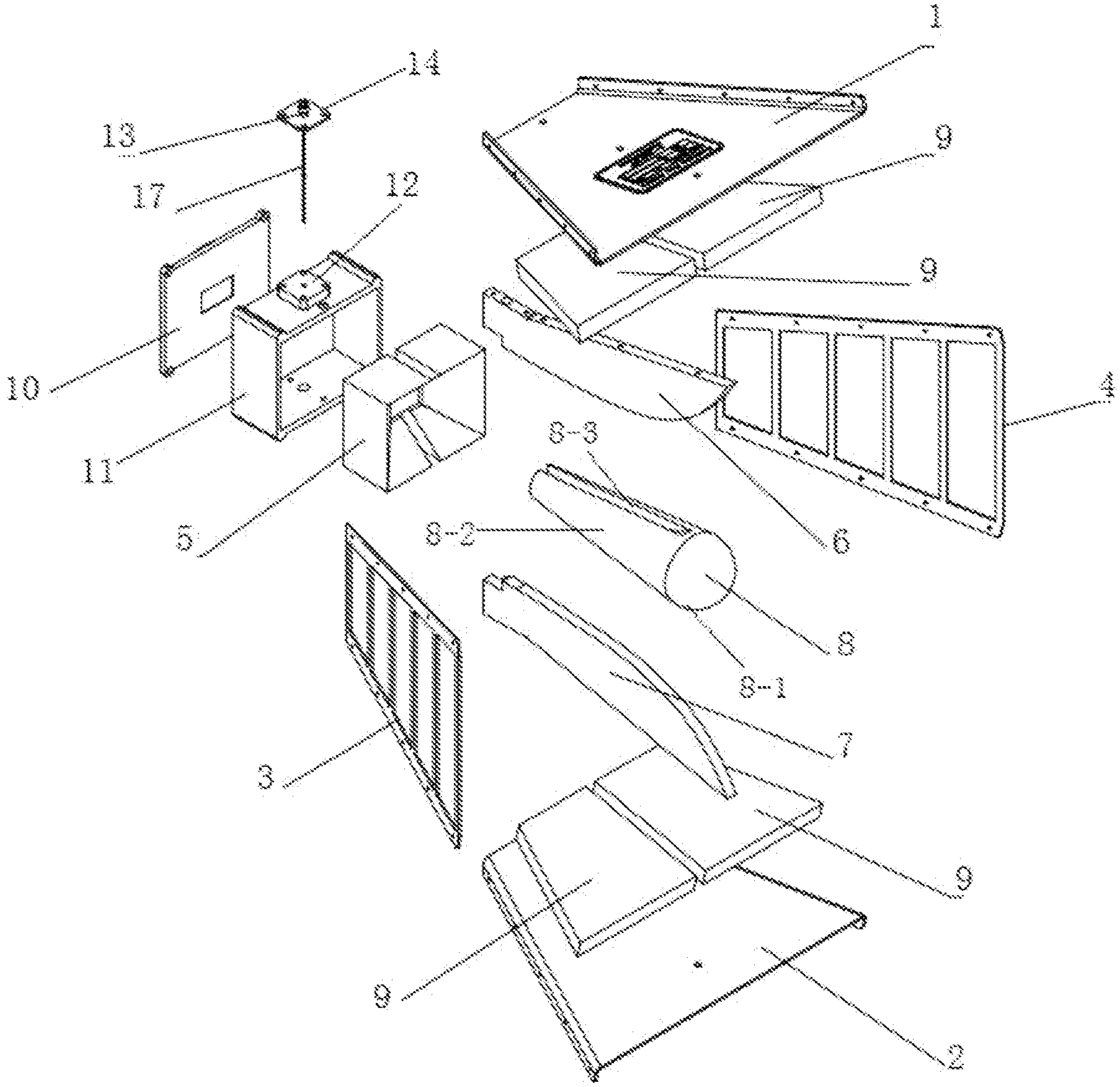
FIG. 9 is a schematic diagram of an exploded structure of an antenna in an embodiment of the present disclosure.

In some embodiments, as shown in FIG. 9, a connector fixing seat 12 is fixed on an upper side plate of the cavity 11, and a connector 13 is fixed to the connector fixing seat by a connector fixing plate 14. Connection and fixation of the connector are conveniently achieved by means of the arrangement of the above devices.

Figure 6:
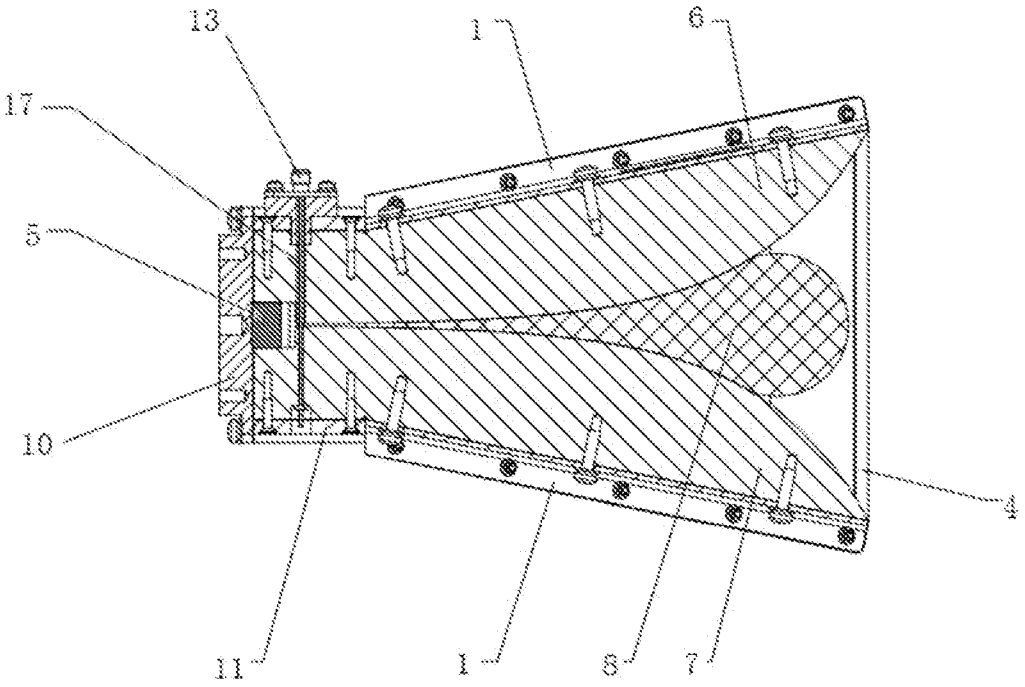
FIG. 6 is a schematic structural diagram of cooperation between an upper ridge, a lower ridge and a central column of an antenna of an embodiment of the present disclosure.
Figure 7:
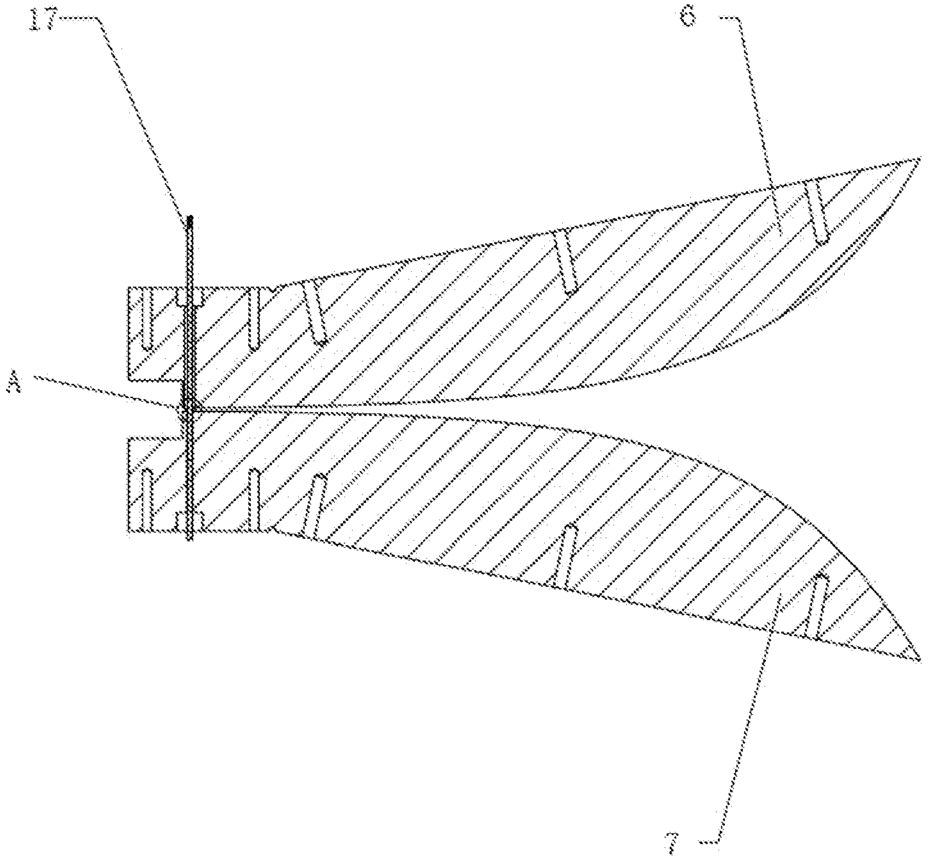
FIG. 7 is a schematic structural diagram of cooperation between the upper ridge and the lower ridge in FIG. 6.
Figure 8:
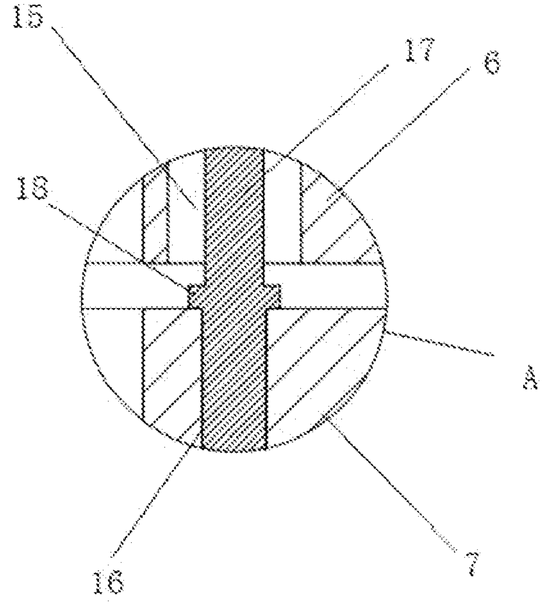
FIG. 8 is an enlarged schematic structural diagram of portion A in FIG. 7.

In some embodiments, as shown in FIGS. 6-8, the tail end of the upper ridge 6 close to the first wave-absorbing material block 5 is provided with a first central hole 15, the first central hole 15 penetrates the tail end up and down, the tail end of the lower ridge 7 close to the first wave-absorbing material block 5 is provided with a second central hole 16 and the second central hole 16 penetrates the tail end up and down, and the first central hole 15 and the second central hole 16 are oppositely provided. An upper end of a central column 17 is electrically connected with the connector 13, a lower end of the central column 17 passes through the first central hole 15 and then enters the second central hole 16, and a lower end of the central column 17 is inserted into a bottom of the second central hole 16. A middle of the central column 17 is connected with an upper end of the second central hole 16 in a clamped manner, and the central column is made of a metal material.

In some embodiments, in order to enable the central column to smoothly enter the second central hole 16 and the first central hole 15, as shown in FIG. 8, an inner diameter of the first central hole 15 is greater than a diameter of the central column 17, and an inner diameter of the second central hole 16 is equal to the diameter of the central column 17. In some embodiments, a protrusion 18 extending outwards is formed in a middle of the central column 17, and an outer diameter of the protrusion 18 is greater than the inner diameter of the second central hole 16, and is smaller than the inner diameter of the first central hole 15, such that the protrusion 18 may be clamped to an upper end opening of the second central hole 16.

Figure 10:
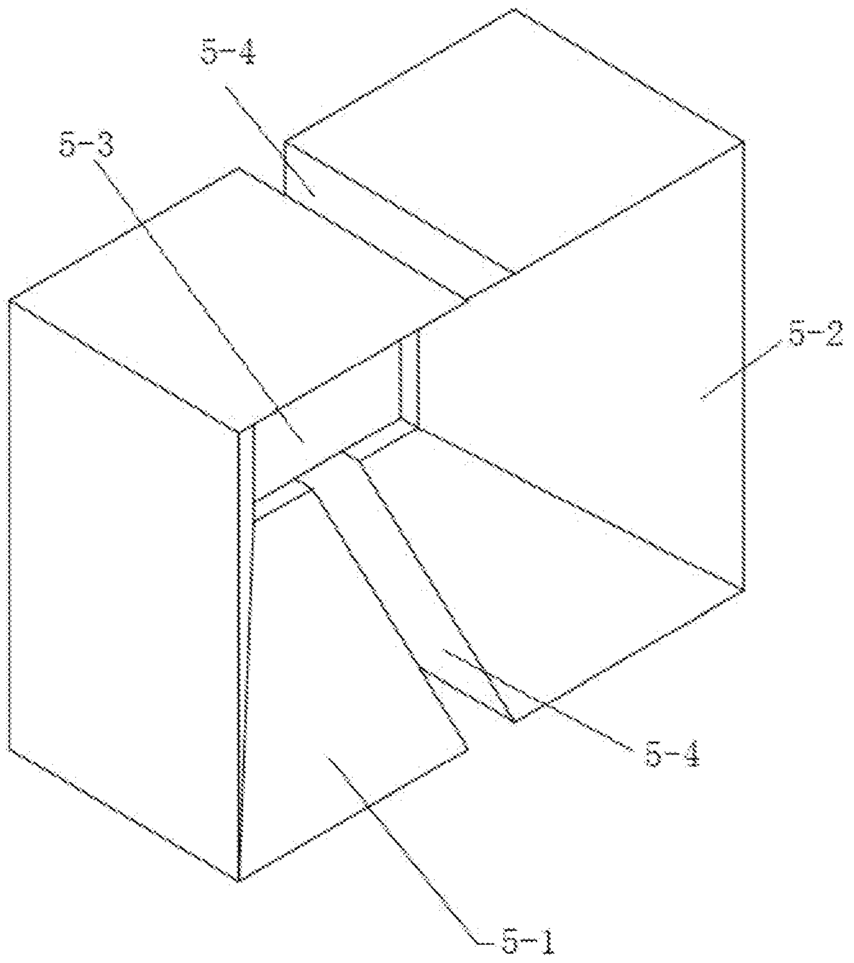
FIG. 10 is a schematic diagram of a three-dimensional structure of a first wave-absorbing material block of an antenna of an embodiment of the present disclosure.
Figure 11:
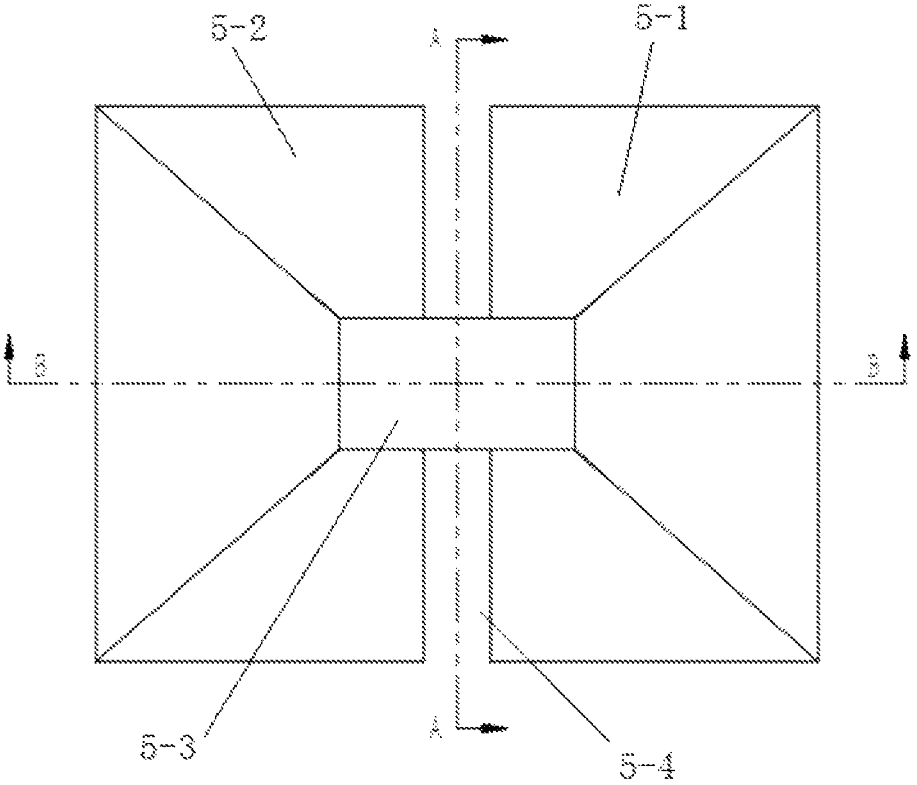
FIG. 11 is a schematic structural diagram from a right view of a first wave-absorbing material block.
Figure 12:
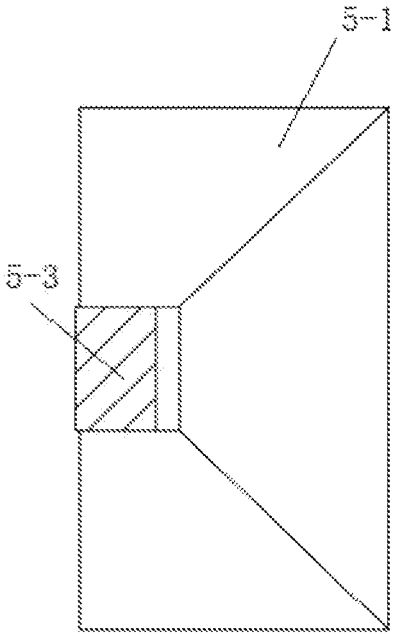
FIG. 12 is a schematic structural diagram from a sectional view of an A-A direction in FIG. 11.
Figure 13:
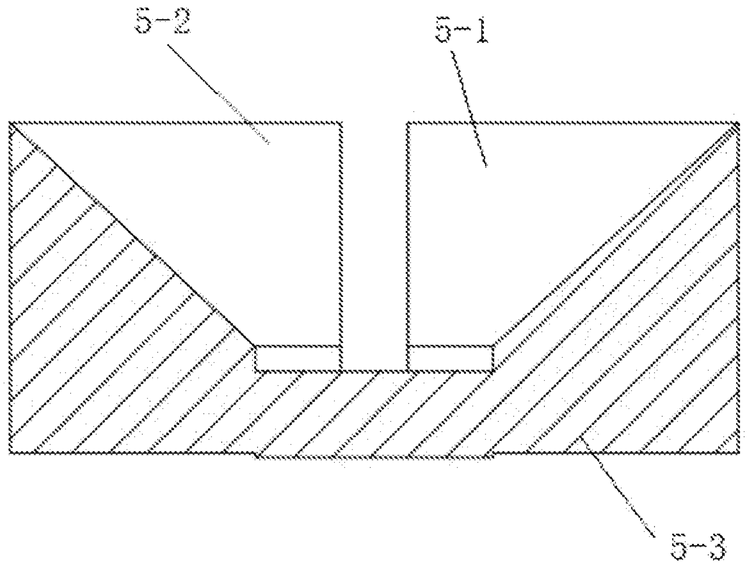
FIG. 13 is a schematic structural diagram from a sectional view of a B-B direction in FIG. 11.

In some embodiments, as shown in FIGS. 10-13, the first wave-absorbing material block 5 includes a first left wave-absorbing material half block 5-1, a first right wave-absorbing material half block 5-2 and a wave-absorbing material connecting block 5-3. The first left wave-absorbing material half block 5-1 and the first right wave-absorbing material half block 5-2 are of a bilateral symmetrical structure, and tail ends of the first left wave-absorbing material half block and the first right wave-absorbing material half block are connected together by the wave-absorbing material connecting block 5-3. A structure of an insertion groove 5-4 is formed between the first left wave-absorbing material half block 5-1 and the first right wave-absorbing material half block 5-2. As shown in FIG. 10, the tail ends of the upper ridge 6 and the lower ridge 7 are inserted into the insertion groove 5-4, and half grooves with gradually reduced depths are formed in surfaces of the first left wave-absorbing material half block 5-1 and the first right wave-absorbing material half block 5-2 that are close to inner sides.

In some embodiments, as shown in FIG. 9, the dielectric rod 8 includes a hemispherical portion 8-1 located at an end portion and a cylindrical portion 8-2 connected with a plane of the hemispherical portion 8-1, and a diameter of the cylindrical portion 8-2 gradually decreases from the end portion to a tail portion. Two opposite clamping grooves 8-3 are formed in the cylindrical portion 8-2, and a portion of the upper ridge 6 and a portion of the lower ridge 7 are inserted into the clamping grooves 8-3 of the dielectric rod 8 separately. The hemispherical portion 8-1 at a first end of the dielectric rod 8 is able to make the fields match better, and a second end is flat, and may be made into another shape, for example, a conical shape. When both ends are sharpened for transition and shaped like a spindle, matching may be better.

Figure 14:
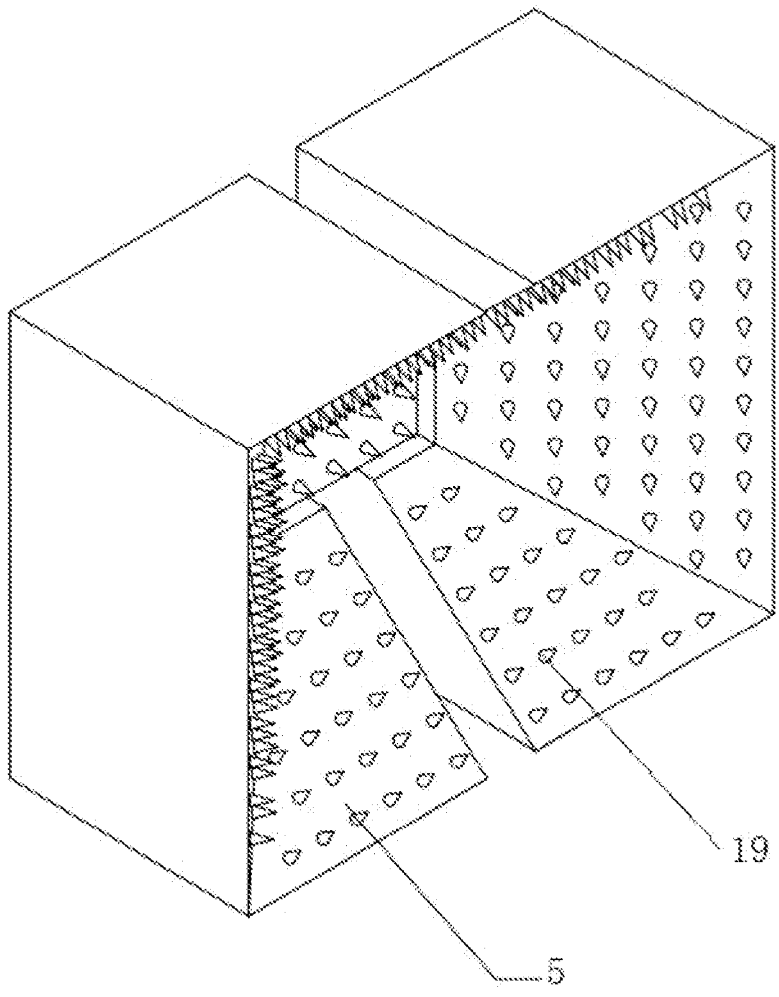
FIG. 14 is a schematic diagram of a three-dimensional structure of another first wave-absorbing material block.
Figure 15:
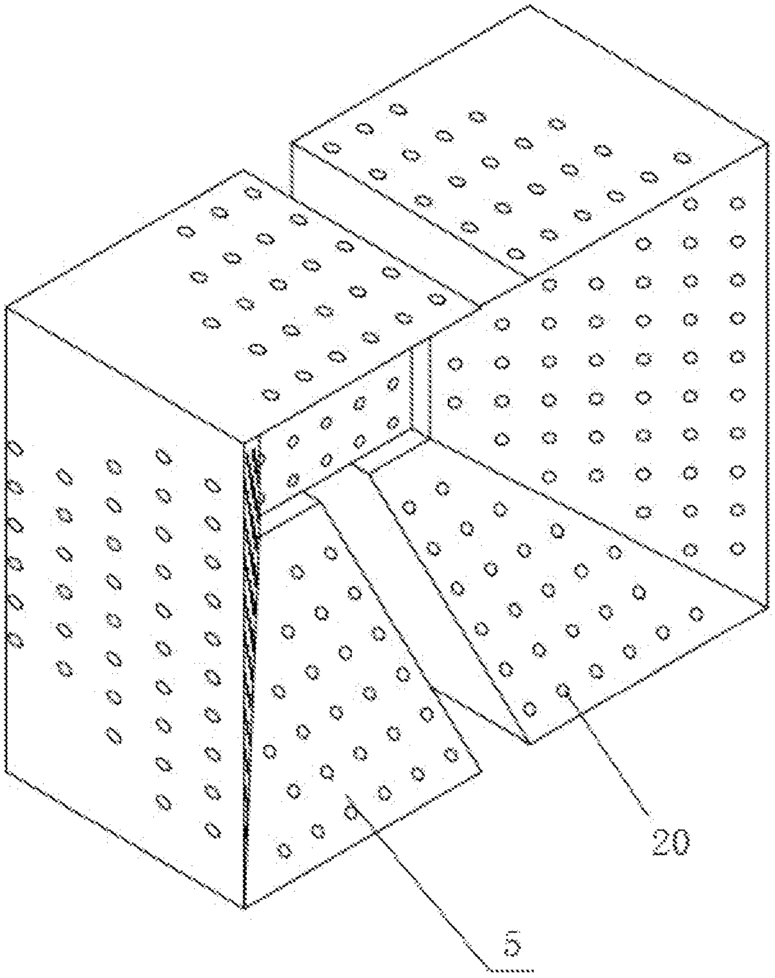
FIG. 15 is a schematic diagram of a three-dimensional structure of another first wave-absorbing material block.

A specific structure of the first wave-absorbing material block 5 at least further includes two kinds as follows: for the first kind, as shown in FIG. 14, multiple small conical protrusions 19 are formed on a surface of the first wave-absorbing material block 5 which is not in contact with the cavity 11; and for the second kind, as shown in FIG. 15, multiple small through holes 20 are formed on a surface of the first wave-absorbing material block 5.

What is claimed is:

1. An ultra-wide band antenna using a wave-absorbing material and a dielectric, comprising an upper fixing plate and a lower fixing plate, wherein a left side plate and a right side plate are fixed between the upper fixing plate and the lower fixing plate separately, the upper fixing plate, the lower fixing plate, the left side plate and the right side plate are fixed together to form a cylindrical structure having a smaller left end opening and a larger right end opening, a cavity is fixed at a left end opening of the cylindrical structure, a first wave-absorbing material block is fixed in the cavity, an upper ridge and a lower ridge are arranged in the cylindrical structure, the upper ridge is fixedly connected with the upper fixing plate in an attached manner, the lower ridge is fixedly connected with the lower fixing plate in an attached manner, tail ends of the upper ridge and the lower ridge are inserted into the first wave-absorbing material block, the upper ridge and the lower ridge are oppositely arranged, a dielectric rod is arranged between the upper ridge and the lower ridge, and both the upper fixing plates on two sides of the upper ridge and the lower fixing plates on two sides of the lower ridge are provided with second wave-absorbing material blocks separately.

2. The ultra-wide band antenna using the wave-absorbing material and the dielectric as claimed in claim 1, wherein several openings are formed in each of the left side plate and the right side plate, such that a left side wall and a right side wall of the cylindrical structure are of an open structure.

3. The ultra-wide band antenna using the wave-absorbing material and the dielectric as claimed in claim 1, wherein a tail end opening of the cavity is closed by a cover plate.

4. The ultra-wide band antenna using the wave-absorbing material and the dielectric as claimed in claim 1, wherein a connector fixing seat is fixed on an upper side plate of the cavity, and a connector is fixed to the connector fixing seat by a connector fixing plate.

5. The ultra-wide band antenna using the wave-absorbing material and the dielectric as claimed in claim 4, wherein the tail end of the upper ridge close to the first wave-absorbing material block is provided with a first central hole penetrating the tail end up and down, the tail end of the lower ridge close to the first wave-absorbing material block is provided with a second central hole penetrating the tail end up and down, the first central hole and the second central hole are oppositely provided, an upper end of a central column is electrically connected with the connector, a lower end of the central column passes through the first central hole and then enters the second central hole, a lower end of the central column is inserted into a bottom of the second central hole, and a middle of the central column is connected with an upper end of the second central hole in a clamped manner.

6. The ultra-wide band antenna using the wave-absorbing material and the dielectric as claimed in claim 5, wherein an inner diameter of the first central hole is greater than a diameter of the central column, and an inner diameter of the second central hole is equal to the diameter of the central column.

7. The ultra-wide band antenna using the wave-absorbing material and the dielectric as claimed in claim 5, wherein a protrusion extending outwards is formed on a middle of the central column, and an outer diameter of the protrusion is greater than an inner diameter of the second central hole, and is smaller than an inner diameter of the first central hole, such that the protrusion is able to be clamped to an upper end opening of the second central hole.

8. The ultra-wide band antenna using the wave-absorbing material and the dielectric as claimed in claim 1, wherein the first wave-absorbing material block comprises a first left wave-absorbing material half block, a first right wave-absorbing material half block and a wave-absorbing material connecting block, the first left wave-absorbing material half block and the first right wave-absorbing material half block are of a bilateral symmetrical structure, tail ends of the first left wave-absorbing material half block and the first right wave-absorbing material half block are connected together by the wave-absorbing material connecting block, an insertion groove is formed between the first left wave-absorbing material half block and the first right wave-absorbing material half block, the tail ends of the upper ridge and the lower ridge are inserted into the insertion groove, and half grooves with gradually reduced depths are formed in surfaces of the first left wave-absorbing material half block and the first right wave-absorbing material half block that are close to inner sides.

9. The ultra-wide band antenna using the wave-absorbing material and the dielectric as claimed in claim 1, wherein the dielectric rod comprises a hemispherical portion located at an end portion and a cylindrical portion connected with a plane of the hemispherical portion, a diameter of the cylindrical portion gradually decreases from the end portion to a tail portion, two opposite clamping grooves are formed in the cylindrical portion, and a portion of the upper ridge and a portion of the lower ridge are inserted into the clamping grooves of the dielectric rod separately.

10. The ultra-wide band antenna using the wave-absorbing material and the dielectric as claimed in claim 1, wherein several small conical protrusions are formed on a surface of the first wave-absorbing material block which is not in contact with the cavity, or several small through holes are formed on a surface of the first wave-absorbing material block.

* * * * *